S. JOHNSTON.
HARVESTER-RAKE.
No. 193,121. Patented July 17, 1877.
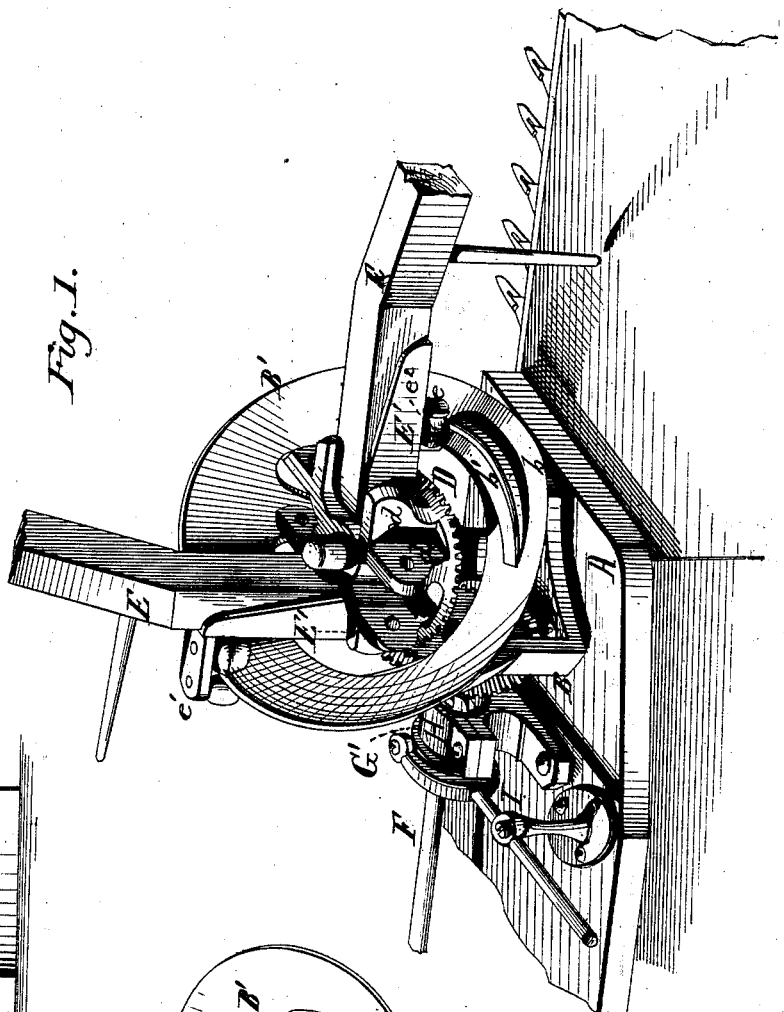
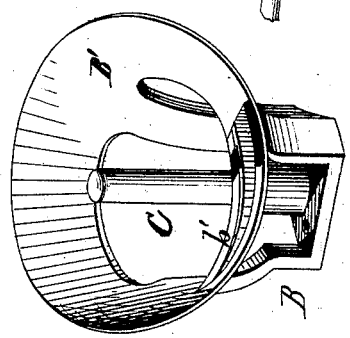
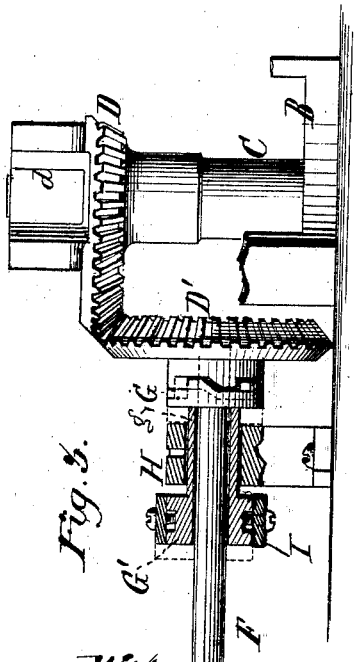
Witnesses:
Alexander Mahon
John G. Center
Inventor:
Samuel Johnston
by A. M. Smith, atty ns bowl-
UNITED STATES PATENT OFFICE.

SAMUEL JOHNSTON, OF BROCKPORT, NEW YORK.

IMPROVEMENT IN HARVESTER-RAKES.

Specification forming part of Letters Patent No. 193,121, dated July 17, 1877; application filed May 1, 1877.

*To all whom it may concern:*

Be it known that I, SAMUEL JOHNSTON, of Brockport, county of Monroe, State of New York, have invented a new and useful Improvement in Harvester-Rake, of which the following is a full, clear, and exact description, reference being had to the accompanying drawing, making part of this specification, in which—

Figure 1 is a perspective view of the rake-cam and gearing, and so much of the rake and platform as is necessary to show my improvement. Fig. 2 is a grain-side elevation of the cam, cam-standard, and rake-pivot detached; and Fig. 3 is a rear elevation, partly in section, showing the arrangement of the clutch for throwing the rake into or out of action.

Similar letters of reference denote corresponding parts in all the figures.

My invention relates to a novel construction of the rake-cam for causing the rakes and beaters or gathering-arms of a combined reel-rake to pursue the different paths necessary to the performance of their respective functions, without the aid of switches or other movable parts; and to a novel arrangement of clutch for throwing the raking mechanism into or out of gear.

The improvement consists, first, in providing the rake-cam, in that part controlling the rake and reel arms in their passage over the platform, with two permanently-fixed ways or cams, arranged at different distances from the rake-shaft, and locating the arms or rollers traveling on said ways on the rake and reel arms at fixed distances from the pivotal centers of said arms, corresponding to said ways according as they are designed for reel or rake arms.

The invention further consists in mounting the sleeve of the sliding clutch, by means of which the rake is thrown into or out of action, in the bearing-standard of the rake-driving shaft in such manner as to make it form a sleeve-bearing for said shaft.

In the accompanying drawing, A represents the grain-platform; B, the rake or rake-cam, standard, or yoke, mounted either on the inner front corner of the same, or on any usual or preferred part of the machine; and B' the rake-cam, secured to said standard either by being cast in one piece therewith, as shown, or in any usual manner. This cam B' is bowl-shaped, and is set inclining toward the grain-platform, as shown; and on its lower face, adjacent to said platform, is provided with a rib or raised portion, set back from its outer edge $b$, as shown, said rib forming a raised track, over which the rollers on the reel-arms pass, the rollers on the rake-arms being set farther out, so as to move over the lower part $b$ of the cam outside of the rib or raised portion $b'$.

C is the vertical rake-pivot, cast in one piece with, or otherwise rigidly secured to, the base-plate of standard B, and upon this pivot is mounted the crown or bevel wheel D, which, in the present instance, is made also to constitute the rotating rake-head, being provided on its upper face with lugs or ears $d\ d$ arranged in pairs forming the points of pivotal support for the rake and reel arms E, as shown.

The rake-head may, however, be made separate from the bevel-wheel, and connected therewith in any usual manner.

The rake and reel arms are connected with the head through metal socket-pieces E', provided on their lower faces with pendent lugs or ears $e$ or $e^1$, arranged at a distance from the pivotal center of the arm determined by the function the arm is intended to perform—that is to say, according to whether it is desired to have it act as a reel-arm only, or as a reel and rake arm, the lugs in the former case being set nearer the pivotal center, for causing the friction-roller $e^2$ mounted thereon to move over the inner raised track $b'$, while those $e^1$ on the rake-arms are located farther out on the arm, adapting them to move over the lower track $b$. The latter, by preference, are provided with two rollers, arranged to grasp the edge of the bowl-cam between them, as shown, and thus to hold the rakes down to their work.

By the construction of the cam and the arrangement of rollers as described all adjustment and consequent liability to displacement of parts is avoided, and the rake and reel arms are made to pursue each the uniform path required for the performance of their respective functions, the reel-arms, after gathering the grain into the cutters and depositing it upon the platform, being raised by the cam $b'$ up out of the grain and leaving it upon the platform, while the rake-arms, following the lower track $b$, are caused to sweep the platform, and to remove the accumulated grain therefrom. The function of the arms cannot be changed, but the arms themselves may be removed and substituted by other arms when it is desired to remove the grain more or less frequently.

The bevel-wheel D meshes with and is driven by a bevel-wheel, D', mounted loosely on the rake-driving shaft F.

The hub or sleeve of wheel D' is provided with a clutch-face adapting it to engage with and be driven by a sliding clutch, G, feathered to and rotating with the shaft F. The clutch G has a sleeve, $g$, which surrounds the shaft F and extends from its outer face through the bearing-standard H, and is provided on its outer end with a grooved collar, G', with which a forked lever, I, engages, and by means of which the attendant is enabled to slide the sleeve with its clutch G in and out on the shaft and within the bearing-standard H for engaging the bevel-wheel with, or disengaging it from, its shaft F.

By this arrangement the means for throwing the rake into or out of action are brought into compact shape, and the wear, instead of being on the shaft, is thrown upon the enlarged surface of the clutch-sleeve, which, when worn, can be removed and replaced or renewed at greatly diminished cost as compared with the cost of renewing the driving-shaft.

Having now described my invention, what I claim as new, and desire to secure by Letters Patent, is—

1. The rake cam or bowl having the two permanently-fixed ways or tracks, one for the rake and the other for the reel arms, as described, in combination with the permanently-fixed rollers, arranged at different distances from the pivotal centers of said arms, and operating in the manner and for the purpose specified.

2. The shaft-protecting and clutch sleeve, arranged and sliding within the bearing for the rake-driving shaft, substantially as described.

In testimony whereof I have hereunto set my hand this 20th day of April, A. D. 1877.

SAMUEL JOHNSTON.

Witnesses:
ALEXANDER MAHON,
J. C. HEALD.